(12) United States Patent
Tiirola et al.

(10) Patent No.: US 11,310,756 B2
(45) Date of Patent: Apr. 19, 2022

(54) FLEXIBLE INDICATION OF TRANSMISSION TIMING

(71) Applicant: NOKIA TECHNOLOGIES OY, Espoo (FI)

(72) Inventors: Esa Tapani Tiirola, Kempele (FI); Sigen Ye, Whitehouse Station, NJ (US); Klaus Ingemann Pedersen, Aalborg (DK); Volker Braun, Stuttgart (DE); Juho Mikko Oskari Pirskanen, Kangasala (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 16/476,419

(22) PCT Filed: Dec. 13, 2017

(86) PCT No.: PCT/EP2017/082511
§ 371 (c)(1),
(2) Date: Jul. 8, 2019

(87) PCT Pub. No.: WO2018/127370
PCT Pub. Date: Jul. 12, 2018

(65) Prior Publication Data
US 2020/0053677 A1 Feb. 13, 2020

Related U.S. Application Data

(60) Provisional application No. 62/444,089, filed on Jan. 9, 2017.

(51) Int. Cl.
*H04W 56/00* (2009.01)
*H04L 1/18* (2006.01)
(Continued)

(52) U.S. Cl.
CPC ......... *H04W 56/003* (2013.01); *H04L 1/1819* (2013.01); *H04L 5/0055* (2013.01); *H04W 72/0446* (2013.01); *H04W 72/14* (2013.01)

(58) Field of Classification Search
CPC .......... H04W 56/003; H04W 72/0446; H04W 72/14; H04L 1/1819; H04L 5/0055;
(Continued)

(56) References Cited

U.S. PATENT DOCUMENTS 8,798,087 B2 * 8/2014 Youn ................... H04W 72/121
370/436
9,066,218 B2 * 6/2015 Oh ........................ H04L 5/0007
(Continued)

FOREIGN PATENT DOCUMENTS

CN 102076094 A 5/2011
CN 103327634 A 9/2013
(Continued)

OTHER PUBLICATIONS

International Search Report and Written Opinion dated Feb. 7, 2018 corresponding to International Patent Application No. PCT/EP2017/082511.
(Continued)

*Primary Examiner* — Habte Mered
(74) *Attorney, Agent, or Firm* — Squire Patton Boggs (US) LLP

(57) ABSTRACT

Various communication systems may benefit from improved signaling. For example, a new radio communication system may benefit from a flexible indication of transmission timing. A method may include determining, at the user equipment, transmission timing based on a first parameter and a second parameter. The first parameter may indicate an offset as a number of slots. The second parameter may indicate an offset as a number of symbols within one of the slots. The
(Continued)

method may also include using the transmission timing to at least one of send an uplink transmission or receive a downlink transmission.

20 Claims, 7 Drawing Sheets

(51) Int. Cl.
*H04L 5/00* (2006.01)
*H04W 72/04* (2009.01)
*H04W 72/14* (2009.01)

(58) Field of Classification Search
CPC ... H04L 5/0053; H04L 5/0044; H04L 5/0082; H04L 5/0091; H04L 5/0007
See application file for complete search history.

(56) References Cited

U.S. PATENT DOCUMENTS

| | | | | |
|---|---|---|---|---|
| 10,334,594 | B2 * | 6/2019 | Sundararajan | H04W 72/0446 |
| 10,548,118 | B2 * | 1/2020 | Patel | H04L 1/1861 |
| 2005/0255862 | A1 * | 11/2005 | Jung | H04W 72/005 455/456.2 |
| 2006/0239264 | A1 * | 10/2006 | Kang | H04L 5/0007 370/390 |
| 2012/0002591 | A1 * | 1/2012 | Noh | H04W 72/0426 370/315 |
| 2013/0028117 | A1 | 1/2013 | Montojo et al. | |
| 2013/0258975 | A1 | 10/2013 | Krishnamurthy et al. | |
| 2014/0177578 | A1 | 6/2014 | Dinan | |
| 2016/0095104 | A1 * | 3/2016 | Chen | H04L 1/0007 370/329 |
| 2016/0226640 | A1 * | 8/2016 | Seol | H04B 7/0695 |
| 2016/0360525 | A1 * | 12/2016 | Cheng | H04L 27/0006 |
| 2017/0290008 | A1 * | 10/2017 | Tooher | H04L 1/0007 |
| 2018/0115984 | A1 * | 4/2018 | Sahlin | H04L 5/0048 |
| 2019/0052329 | A1 * | 2/2019 | Aiba | H04L 5/006 |

FOREIGN PATENT DOCUMENTS

| | | |
|---|---|---|
| CN | 105794137 A | 7/2016 |
| EP | 1860787 B2 | 11/2007 |
| JP | 5088434 B2 | 12/2012 |
| JP | 2014-27510 A | 2/2014 |
| JP | 2014-239489 A | 12/2014 |
| KR | 10-0800887 B1 | 2/2008 |
| WO | 2015/142429 A1 | 9/2015 |
| WO | 2016/161545 A1 | 10/2016 |

OTHER PUBLICATIONS

First Examination Report issued in corresponding Indian Patent Application No. 201947031276 dated Jan. 12, 2021.

Notice of Preliminary Rejection issued in corresponding Korean Patent Application No. 10-2019-7023478 dated Nov. 5, 2020, with English summary thereof.

Notification of Reasons for Rejection (non-final) dated Aug. 17, 2020 corresponding to Japanese Patent Application No. 2019-537240, with concise statement of relevance.

Motorola Mobility, "Flexible frame structure and control signaling for NR," R1-1609919, 3GPP TSG RAN WG1 #86bis, Lisbon, Portugal, Oct. 14, 2016.

First Office Action issued in corresponding Chinese Patent Application No. 201780082659.8 dated Jun. 3, 2021, with English summary thereof.

Huawei, HiSilicon, "Introductions of Uplink Closed Loop Transmit Diversity for HSPA", R1-112813, 3GPP TSG-RAN1 Meeting #66, Aug. 22, 2011.

Communication pursuant to Article 94(3) EPC issued in corresponding European Patent Application No. 17 818 099.8 dated Feb. 19, 2021.

Decision of Final Rejection issued in corresponding Japanese Patent Application No. 2019-537240 dated Feb. 18, 2021, with English summary thereof.

\* cited by examiner

FLEXIBLE INDICATION OF TRANSMISSION TIMING

CROSS REFERENCE TO RELATED APPLICATION

This application claims priority to U.S. Provisional Patent Application No. 62/444,089 filed on Jan. 9, 2017. The entire content of the above-referenced application is hereby incorporated by reference.

BACKGROUND

Field

Various communication systems may benefit from improved signaling. For example, a new radio communication system may benefit from a flexible indication of transmission timing.

Description of the Related Art

Third Generation Partnership Project (3GPP) New Radio (NR) technology is a part of 3GPP's fifth generation (5G) radio access technology (RAT). One of the objectives of the NR study item in 3GPP, is to identify and develop components and framework for NR systems to be able to use any spectrum band ranging at least up to 100 gigahertz (GHz). Recent developments have aimed at integrating all usage scenarios, requirements, and deployments within a single technical framework.

NR physical layer design supports an NR frame structure having both a slot and a mini-slot. While the duration of the slot is 7 or 14 symbols, depending on the subcarrier spacing of the user numerology, the duration of the mini-slot is about 1 or 2 symbols, or between 1 and the slot length minus 1. The allowed mini-slot lengths may be defined by the specification and/or higher layer signaling, and they may vary according to higher layer signaling, such as radio resource control signaling. The short duration of the mini-slots allow for multiple mini-slots to be included in a given slot, and for different user equipment (UE) transmissions to occur in different mini-slots. Mini-slots therefore provide for time multiplexing between different UEs when operating at higher frequencies, and when using radio frequency beamforming architecture.

SUMMARY

According to a certain embodiment, a method may include determining, at a user equipment, transmission timing based on a first parameter and a second parameter. The first parameter may indicate an offset as a number of slots. The second parameter may indicate an offset as a number of symbols within one of the slots. The method may also include using the transmission timing to at least one of send an uplink transmission from the user equipment to a network entity or receive a downlink transmission at the user equipment from the network entity.

In a variant, the method may include determining the transmission timing based at least on a third parameter that may indicate an end of the transmission as a number of slots, or a fourth parameter that may indicate the end of the transmission as a symbol position within one of the slots.

In a further variant, the method may also include receiving from the network entity at least one of the first parameter, the second parameter, the third parameter, or the fourth parameter.

In another variant, the transmission timing may be a scheduling timing or a hybrid automatic repeat request acknowledgment feedback timing.

In an additional variant, the transmission may relate to a mini-slot operation.

In yet another variant, the uplink transmission or the downlink transmission may include a mobility reference symbol, a channel state information reference symbol, a physical uplink control channel transmission, a physical uplink shared channel transmission, a physical downlink control channel transmission, a physical downlink shared channel transmission, or a sounding reference symbol.

In an additional variant, the slot may be or include a mini-slot.

In a further variant, at least one of the first parameter, the second parameter, a third parameter, a fourth parameter, or an additional parameter are at least one of semi-statically configured, received at the user equipment from the network entity, or derived implicitly using at least one of the first parameter, the second parameter, the third parameter, or the fourth parameter.

In a variant, multiple numerologies may exist within at least a single symbol, slot, or mini-slot.

In another variant, an additional parameter may be used to indicate at least one of the multiple numerology that may exist within at least the single symbol, the slot, or the mini-slot.

In yet another variant, the first parameter is derived from the second parameter or the second parameter is derived from the first parameter.

In a further variant, the method may include determining a duration of the transmission timing based at least on a third parameter that may indicate an end of the transmission as a number of slots, or a fourth parameter that may indicate the end of the transmission as a symbol position within one of the slots.

In another variant, the offset in the second parameter may include an absolute symbol index within the slot.

In a variant, the offset in the number of symbols in second parameter may include a number of symbols relative to a grant.

In a variant, the method may also include receiving at the user equipment a combined parameter that may include at least two of the first parameter, the second parameter, the third parameter, or the fourth parameter.

According to certain embodiments, an apparatus may include at least one memory including computer program code, and at least one processor. The at least one memory and the computer program code may be configured, with the at least one processor, to cause the apparatus at least to determine transmission timing based on a first parameter and a second parameter. The first parameter may indicate an offset as a number of slots. The second parameter may indicate an offset as a number of symbols within one of the slots. The at least one memory and the computer program code may also be configured, with the at least one processor, to cause the apparatus at least to use the transmission timing to at least one of send an uplink transmission from the user equipment to a network entity or receive a downlink transmission at the user equipment from the network entity.

An apparatus, in certain embodiments, may include means for determining, at a user equipment, transmission timing based on a first parameter and a second parameter. The first parameter may indicate an offset as a number of slots. The second parameter may indicate an offset as a number of symbols within one of the slots. The apparatus also includes means for using the transmission timing to at least one of send an uplink transmission from the user equipment to a network entity or receive a downlink transmission at the user equipment from the network entity.

According to certain embodiments, a non-transitory computer-readable medium encoding instructions that, when executed in hardware, perform a process. The process may include determining, at a user equipment, transmission timing based on a first parameter and a second parameter. The first parameter may indicate an offset as a number of slots. The second parameter may indicate an offset as a number of symbols within one of the slots. The process may also include using the transmission timing to at least one of send an uplink transmission from the user equipment to a network entity or receive a downlink transmission at the user equipment from the network entity.

According to certain other embodiments, a computer program product may encode instructions for performing a process. The process may include determining, at a user equipment, transmission timing based on a first parameter and a second parameter. The first parameter may indicate an offset as a number of slots. The second parameter may indicate an offset as a number of symbols within one of the slots. The process may also include using the transmission timing to at least one of send an uplink transmission from the user equipment to a network entity or receive a downlink transmission at the user equipment from the network entity.

According to certain embodiments, a method may include determining at a network entity a first parameter and a second parameter. The first parameter may indicate an offset as a number of slots. The second parameter may indicate an offset as a number of symbols within one of the slots. The method may also include sending the first parameter and the second parameter from the network entity to a user equipment.

In a variant, the method may include determining at the network entity a third parameter that may indicate an end of the transmission as a number of slots, or a fourth parameter that may indicate the end of the transmission as a symbol position within one of the slots.

In a further variant, the method may also include using at least one of the first parameter, the second parameter, the third parameter, or the fourth parameter to determine a transmission timing for at least one of sending a downlink transmission from the network entity to the user equipment or receiving an uplink transmission at the network entity from the user equipment.

In an additional variant, the slot may be or include a mini-slot.

In yet another variant, the first parameter is derived from the second parameter or the second parameter is derived from the first parameter.

In another variant, the offset in the number of symbols in second parameter may include an absolute symbol index within the slot.

In a variant, the sending of the first parameter, the second parameter, the third parameter, and/or the fourth parameter by the network entity may be dynamic.

According to certain embodiments, an apparatus may include at least one memory including computer program code, and at least one processor. The at least one memory and the computer program code may be configured, with the at least one processor, to cause the apparatus at least to determine a first parameter and a second parameter. The first parameter may indicate an offset as a number of slots. The second parameter may indicate an offset as a number of symbols within one of the slots. The at least one memory and the computer program code may also be configured, with the at least one processor, to cause the apparatus at least to send the first parameter and the second parameter from the network entity to a user equipment.

An apparatus, in certain embodiments, may include means for determining at a network entity a first parameter and a second parameter. The first parameter may indicate an offset as a number of slots. The second parameter may indicate an offset as a number of symbols within one of the slots. The apparatus also includes means for sending the first parameter and the second parameter from the network entity to a user equipment.

According to certain embodiments, a non-transitory computer-readable medium encoding instructions that, when executed in hardware, perform a process. The process may include determining at a network entity a first parameter and a second. The first parameter may indicate an offset as a number of slots. The second parameter may indicate an offset as a number of symbols within one of the slots. The process may also include sending the first parameter and the second parameter from the network entity to a user equipment.

According to certain other embodiments, a computer program product may encode instructions for performing a process. The process may include determining at a network entity a first parameter and a second. The first parameter may indicate an offset as a number of slots. The second parameter may indicate an offset as a number of symbols within one of the slots. The process may also include sending the first parameter and the second parameter from the network entity to a user equipment.

BRIEF DESCRIPTION OF THE DRAWINGS

For proper understanding of the invention, reference should be made to the accompanying drawings, wherein.

DETAILED DESCRIPTION

Figure 1:
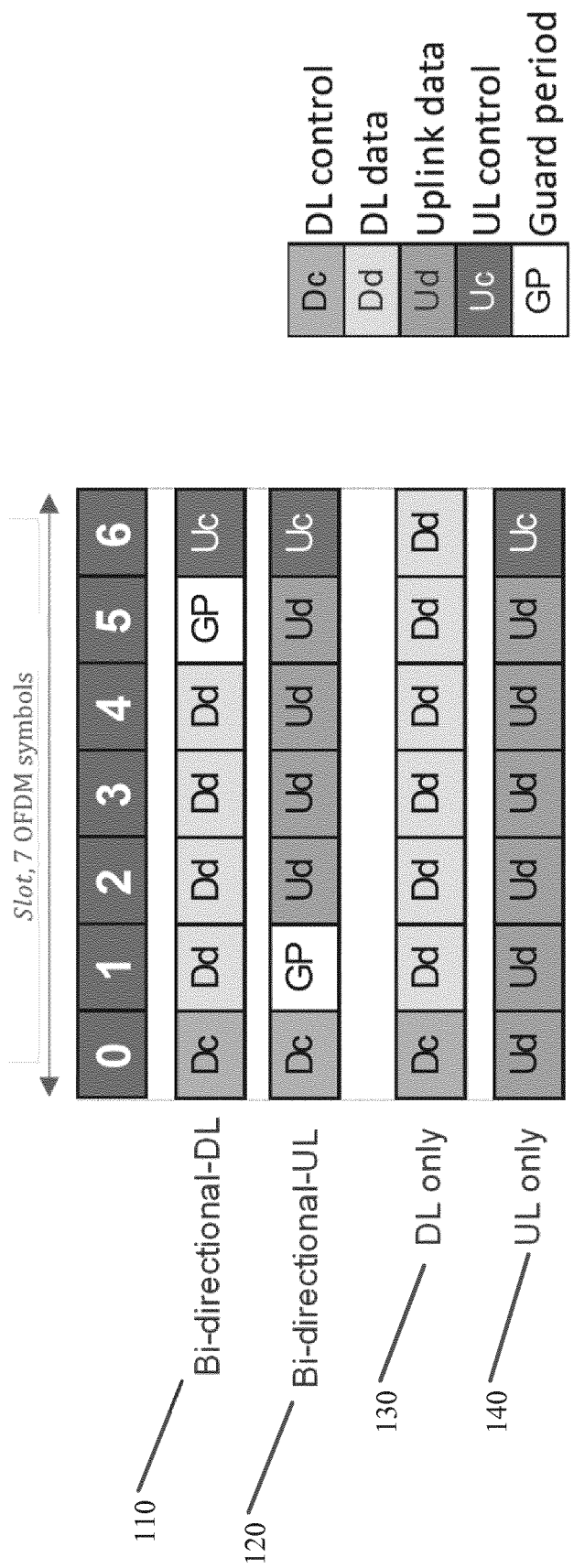
FIG. 1 illustrates a diagram according to certain embodiments.

Certain embodiments allow for a flexible indication of transmission timing, such as scheduling timing and/or hybrid automatic repeat request (HARQ) acknowledgement timing, in NR technology. Scheduling timing may be the timing of any transmission of data and/or control information to and from the network. HARQ timing may relate to timing between data reception or transmission in one link direction, and a corresponding transmission or reception of an HARQ acknowledgement (HARQ-ACK) in another link direction. The flexible indication may include either slot-based or mini-slot-based scheduling. The transmission timing, for example, may indicate to a UE when transmissions may occur on a physical downlink shared channel (PDSCH) or a physical uplink control channel (PUCCH), after the UE receives a downlink and/or an uplink grant. In other embodiments, the transmission timing, for example, may indicate to the UE when transmission may occur on a physical downlink control channel (PDCCH) or a physical uplink control channel (PUCCH). The transmission timing may also dictate when transmission will occur or will be triggered for any other form of transmission, such as HARQ-ACK, a pilot symbol, or a sounding reference symbol.

HARQ-ACK timing for DL may inform the UE when to transmit HARQ-ACK feedback after having received the PDSCH information. HARQ-ACK timing for UL in NR may also be defined, even though in some embodiments involving asynchronous HARQ an explicit HARQ-ACK timing may not be needed.

To achieve flexible transmission timing, certain embodiments may utilize at least two different parameters. The first parameter may indicate an offset as a number of slots, while the second parameter may indicate an offset as a number of symbols within one of the slots. In other words, the second parameter may indicate a position of a symbol within a slot. The UE may use the two parameters to send an uplink transmission or to receive a downlink transmission. The parameters may be received by the UE from the network entity, in some embodiments, may be semi-statically configured by the network, and/or may be implicitly derived. For example, the transmission timing, for example, may be a scheduling timing or an HARQ-ACK timing.

As discussed above, NR may allow for both slots and mini-slots. While the duration of a slot may be either 7 or 14 symbols, or a multiple of 7 symbols or multiple of 14 symbols, depending on the subcarrier spacing being used, the duration of the mini-slot may be about 1 or 2 symbols. The length of a slot and/or mini-slot may correspond to a minimum scheduling unit in time. Slot based scheduling may be used as the baseline in the cell. Mini-slot-based scheduling may be configured via a higher layer signaling for one or more UEs in the cell. Subcarrier spacing may be a type of numerology, for example. The symbols, in some embodiments, may be orthogonal frequency division multiplexing (OFDM) symbols, orthogonal frequency division multiple access (OFDMA) symbols, single carrier frequency division multiple access (SC-FDMA) symbols, or single carrier zero tail symbols (SC-ZT). In other embodiments, any other type of symbol may be utilized.

In some embodiments, the NR framework may include a subframe having a reference numerology value of 14 symbols per subframe. Such embodiments may include a 15 kilohertz (kHz) subcarrier spacing and a normal cyclic prefix length. A subframe may provide a time reference of 1 millisecond (ms) independent from selected numerology. The slots, in certain embodiments, may have a duration of 7 or 14 OFDM symbols, and an integer number of slots may fit within one subframe when the subcarrier spacing is larger than or equal to the reference numerology. For example, for a subcarrier spacing (SCS) of up to 60 kHz, the duration of the slot may be 7 or 14 symbols. When the SCS is higher than 60 kHz, the duration of the slots may be 14 symbols. The structure of the slot may allow for control information to be received at the end and/or the beginning of the slot. The slot length in time may scale or depend upon a selected numerology.

Mini-slots, as discussed above, are shorter than slots in terms of the number of symbols used. The mini-slots may include control information at the beginning and/or at the end of the mini-slot. The smallest mini-slot may in some embodiments be the smallest possible scheduling unit. Mini-slots, for example, may have a duration of one symbol. The mini-slot may include a demodulation reference signal (DMRS) at a position relative to the start of the mini-slot.

FIG. 1 illustrates a diagram according to certain embodiments. In particular, FIG. 1 illustrates four different slot types, which each slot type including 7 OFDM symbols. As can be seen in FIG. 1, four different types of symbols may be used to provide basic support for both time division duplex (TDD) and frequency division duplex (FDD). In bi-directional slots 110 and 120, each slot may be dedicated to either downlink data (Dd) transmission or uplink data (Ud) transmission. In addition, each bi-directional slot 110, 120 may include downlink control (Dc) information and/or uplink control (Uc) information. In certain embodiments, bi-directional slots 110, 120 may include a guard period (GP), as shown in FIG. 1. Bi-directional slots may help to facilitate TDD functionalities in a NR frame structure. For example, link direction switching between downlink (DL) and uplink (UL), fully flexible traffic adaptation between DL and UL, and/or opportunity for low latency communications when a short slot length is selected.

Slots 130 and 140 in FIG. 1, on the other hand, illustrate uni-directional slots for DL only or a UL only. In slots 130 and 140 no guard period may be provided, and DL control and UL control information may be respectively included in the first or last symbol of the slots, or in any other position within the slot). While slots 130 and 140 may be utilized at least in FDD mode, the slot may also be used in certain TDD scenarios to allow for longer transmissions periods in the downlink or uplink direction.

In certain embodiments, multiplexing between DL control, DL data, UL data, GP, and/or UL control is based at least in part on time division multiplexing (TDM). Utilizing TDM may allow for fast, energy efficient pipeline processing of control information and data in a receiver. Physical downlink control channel (PDCCH) information or transmissions may be included in the DL control symbol located at the beginning of the slot or mini-slot, while PUCCH information or transmissions may be included in the UL control symbol located at the end of the slot or mini-slot. Certain other embodiments, however, may utilize frequency division multiplexing in which information conveyed through the PDCCH and/or PDSCH may be multiplexed in a frequency domain, rather than a time domain.

In certain embodiments, mini-slots may be used for latency reduction, as well as unlicensed band operation. For example, in an embodiment that utilizes a 15 kHz SCS, using mini-slots-based transmissions, as opposed to slot-based transmissions, may be advantageous. The latency reducing nature of mini-slots may also allow for the use of mini-slots to lower air interface latency in ultra-reliable and low-latency communications (URLLC) and enhanced mobile broadband (eMBB). In eMBB, mini-slots may be used to overcome slow start transmission control protocol (TCP) procedures.

The beamforming architecture used in the 5G NodeB (gNB) may be taken into account at least in part of the design of the mini-slot. For hybrid beamforming operating with a limited number of radio frequency (RF) beams in parallel, it may be difficult for the beams to cover only a portion of the cell coverage at a time. The narrower a beam the less UEs can share the same beam. Given the low number of available high accuracy and large bandwidth transceiver units (TXRUs), the multiplexing capacity of a gNB may be limited by the number of TXRUs. Considering physical layer design, and taking into account the hardware limitation, it may be possible to facilitate efficient TDM within a slot, in order to get reasonable payload sizes for DL and/or UL shared channels. A mini-slot can be used to facilitate TDM within a slot in an efficient manner. In certain embodiments, the transmission shown in FIG. 2 may relate to a mini-slot operation. For a further explanation of the mini-slot design, please see 3GPP TSG-RAN WG1#NR, R1-1701051. 3GPP TSG-RAN WG1#NR, R1-1701051 is hereby incorporated in its entirety by reference.

Some embodiments may include high level flexibility in both scheduling timing and HARQ timing in NR technology. The flexibility may be created at the symbol level, and may provide for dynamic adjustments to provide for optimal transmission timing with the network. In some Long Term Evolution (LTE) technology, the transmission timing may simply be defined using basic time units of a subframe, or transmission time intervals (TTI) in a semi-static manner. NR technology, however, may utilize a higher level of flexibility at the symbol level for both scheduling timing and HARQ timing.

Flexible and dynamic schedule timing may be used as part of a dynamic TDD in NR technology. The flexible schedule timing may allow a network entity, such as a base station to dynamically determine, as part of the PUSCH, which slots or mini-slots should be assigned to DL or UL. For PDSCH, an offset between the PDSCH and the PDCCH may be indicated in terms of OFDM symbols. The offset indication may be helpful in an embodiment in which the starting symbol of the PDSCH may vary due to variations in the DL control region, and/or in an embodiment in which the starting position of the scheduled mini-slot may vary. In some embodiments, the starting symbol in PUSCH may also vary. The variance in the starting symbol of PUSCH may vary depending on the duration of the DL control region in the slot, or the varying starting position of the scheduled mini-slot. For a further explanation of the mini-slot design, please see 3GPP TSG-RAN WG1#NR, R1-1701052. 3GPP TSG-RAN WG1#NR, R1-1701052 is hereby incorporated in its entirety by reference.

In certain embodiments, the NR may support different network implementations, where the medium access control (MAC) layer or the physical (PHY) layer are implemented in a distributed manner, in which the layers are separated with a fronthaul or advanced backhaul connection. For example, a centralized unit, hosting the MAC, and at least one remote radio head (RRH) may interconnect via one or more fronthaul links. The common public radio interface (CPRI) or the open base station architecture initiative (OBSAI) round trip time (RTT) latency may be between 0.3 ms to 0.5 ms. Ethernet fronthaul implementations, on the other hand, may have a RTT latency of between 2 ms to 5 ms. The above RTT measurements may relate to embodiments in which there may be some distance, for example several kilometers, between the RRHs and the centralized unit. The fronthaul latency may be taken into account when determining the NR scheduling timing and/or HARQ timing, ensuring that flexibility exists to allow for at least some of implementation variations discussed above.

For HARQ-ACK timing in PDSCH, for example, a flexible and/or dynamic transmission timing indication may be used to support dynamic TDD frame structure. Because PUCCH may start in different symbols in a slot, it may be helpful to indicate the starting symbol for PUCCH in a given slot. Certain embodiments may support TDM of short PUCCH from different UEs in the same slot.

Some embodiment may also use same or different numerologies for transmission of control information and/or data. The granularity for the scheduling timing and/or HARQ timing may be the smaller symbol duration between the different numerologies. The different numerologies may be either multiplexed in either the time domain and/or the frequency domain.

Figure 2:
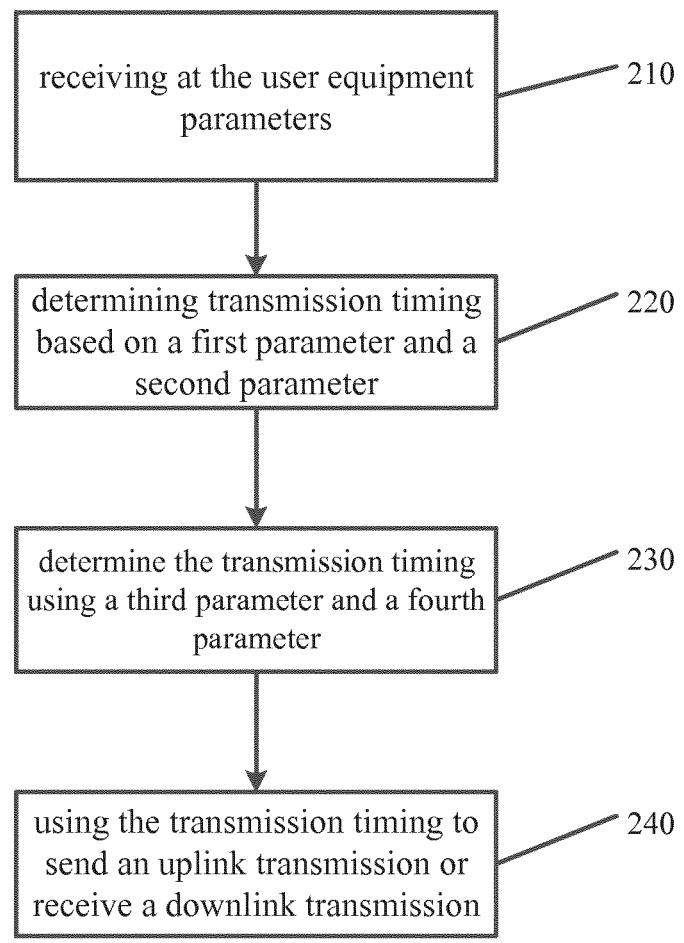
FIG. 2 illustrates a flow diagram according to certain embodiments.
Figure 3:
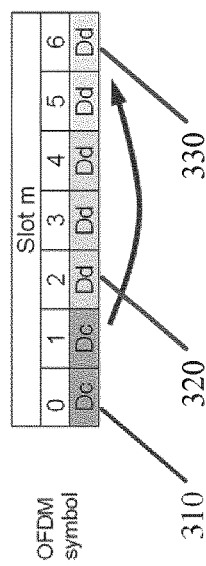
FIG. 3 illustrates a diagram according to certain embodiments.

FIG. 2 illustrates a flow diagram according to certain embodiments. In particular, FIG. 2 illustrates a user equipment. In step 210, the user equipment may receive from the network entity at least one of a first parameter or a second parameter. As will be discussed below, in some other embodiments, in the user equipment at least one of a first parameter or a second parameter may be implicitly derived and/or semi-statically configured. The user equipment, in step 220, may then determine a transmission timing based on a first parameter and a second parameter received from the network entity. The transmission timing may be a scheduling timing or an HARQ-ACK timing. The first parameter (M) may indicate an offset as a number of slots or mini-slots. The second parameter (N) may indicate an offset as a number of symbols within one of the slots or the mini-slots. In some embodiments, the number of symbols may be said to be units of symbols, while number of slots may be said to be units of slots. The symbols, in certain embodiments, may be OFDM symbols. The symbol position indicated by the second parameter may be an offset in the symbols within a slot or mini-slot, or an absolute symbol index within the slot, which is counted from the first symbol of the slot, or from any other predefined symbol number. In other words, the offset in the number of symbols in the second parameter may include a number of symbols relative to a grant or an absolute symbol index. Examples of the first and second parameters, as well as the absolute symbol index are shown in FIG. 3.

In certain embodiments, the parameters may be dynamically signaled to the UE, semi-statically configured, and/or implicitly determined by the UE. As shown in step 230, the UE may determine the transmission timing based at least on a third parameter (M2) that may indicate an end of the transmission as a number of slots, and a fourth parameter (N2) that may indicate the end of the transmission as a symbol position within one of the slots. Similar to the first and the second parameters, the third and fourth parameters may be dynamically signaled to the UE, semi-statically configured, and/or implicitly determined by the UE. In step 240, the UE may use the transmission timing to send an uplink transmission and/or receive a downlink transmission.

An alternative to indicating the third parameter M2 and/or the fourth parameter N2 may be to determine the duration of the transmission, for example, in terms of the number of slots or OFDM symbols. In such an embodiment, transmission duration of each control transmission and or data transmission may be either predefined or preconfigured via a higher layer signaling or indicated dynamically via physical layer or first layer (L1) DL signaling, such as DL control information (DCI). Certain embodiments may also use a combination of higher layer signaling and L1 DL signaling for conveying the information indicating the duration of transmission from gNB to UE.

The above embodiments provide the full flexibility for the transmission timing having the granularity of an OFDM symbol, for example. Transmission timing may be either UL data or DL data scheduling timing. In other embodiments, transmission timing may be HARQ-ACK feedback timing for DL or UL data transmissions. In yet another embodiment, transmission timing may include scheduling timing for mobility reference symbols (MRS), channel state information reference symbols (CSI-RSI), uplink control channel (PUCCH), and/or sounding reference symbols (SRS). MRS may be any reference symbol used in mobile communications network.

The total scheduling delay, in terms of OFDM symbols, for example, may be determined using the following equation: $M*y+N$, where N represents the offset in OFDM symbol within the slot relative to the grant, M represents the offset in terms of the number of slots, and y represents the slot length determining the scheduling period for slot-based scheduling. For example, when operating in a NR environment with a typical cyclic prefix length, y may be a multiple of 7 OFDM symbols, or when operating with an extended cyclic prefix length y may be a multiple of 6 OFDM symbols, or include 13 OFDM symbols. In other embodiments, y may be any other integer. On the other hand, if N represents the absolute OFDM symbol index within a slot, the total scheduling delay may be determined using the following equation: $M*y+N-k$, where k represents the OFDM symbol index of the starting symbol of the DL and/or UL grant.

The end of the scheduled uplink grant or downlink allocation, in terms of OFDM symbols, can be determined using the first, second, third, and fourth parameters. In other words, the first and second parameters can be used to determine the transmission timing, or when the transmission may occur, while the third and fourth parameters may be used to determine the duration of the transmission, or for how long the transmission may be carried out for. In one embodiment, in which N indicates the offset in OFDM symbols within the slot relative to the grant, the end of the scheduled uplink grant or downlink allocation may be determined using the following equation: $(M2+M)*y+N2+N$. On the other hand, when N represents the absolute OFDM symbol index within a slot, the end of the scheduled uplink grant or downlink allocation may be determined using the following equation: $(M2-M)*y+N2+N-k$.

For embodiments in which the HARQ timing is determined, an offset as a number of symbols within one of the slots, meaning the delay or offset of the symbol position within the slot, may be relative to the DL or UL grant and/or the DL or UL data transmission. The HARQ timing may also be determined from either the start or end position of the corresponding DL or UL grant and/or the DL or UL data transmission.

In other embodiments, the UE may receive at least one parameter, as shown in step 210. For example, first parameter M and/or second parameter N may be dynamically received by the UE in the DL or UL grant. In other embodiments, the third parameters M2 and/or fourth parameter N2 may also be dynamically received by the UE. Providing the parameters dynamically to the UE may allow the network entity scheduling flexibility. The network entity may use the dynamic signaling to inform the UE when the network may want to take advantage of a mini-slot, slot, and/or mini-slot scheduling.

In some embodiments, first parameter M may be dynamically sent to the UE, while second parameter N may be semi-statically configured. The parameters may be semi-statically configured by the user equipment, the network entity, or any other entity within the network. In addition, in certain embodiments, third parameters M2 and fourth parameter N2 may also be semi-statically configured. A semi-static configuration may be used, for example, when the network entity chooses to use a fixed structure where the DL control region is fixed, and the PUCCH position is fixed in a slot. In such an embodiment, the network entity may not dynamically indicate or send the parameters, which may include the symbol offset, to the UE.

In other embodiments, however, first parameter M may be semi-statically configured to the UE, while second parameter N may be dynamically indicated or sent to the UE. In yet another embodiment, both first parameter M and second parameter N may be semi-statically configured. Semi-statically configuring both first parameter M and second parameter N may be used in an embodiment in which a TDD has a semi-statically configured frame structure and/or in an embodiment involving FDD.

The first parameter M and the second parameter N may also be derived implicitly. In a URLLC, second parameter N may be indicated dynamically to the UE, and first parameter M be derived from second parameter N. In other embodiments, the second parameter N may be derived from the first parameter M. In some embodiments, the value of first parameter M may equal zero when the UL and/or DL grant or the UL and/or DL data transmissions start within the first k number of symbols in the slot. k, for example, may be 3 symbols. Because the transmission occurs within the same slot, however, than the value of first parameter M may be zero.

In certain other embodiments, first parameter M may equal to one when the UL and/or DL grant or the UL and/or DL data transmissions start outside the first k number of symbols in the slot. When the UL and/or DL grant or the UL and/or DL data transmissions start outside the first k number of symbols in the slot, the next symbol may be said to not support the current use case. In other words, if the current use case represents an invalid link direction, then the next valid slot may be considered instead of the current slot in which the value of first parameter M may equal zero. For example, if the next symbol is a guard period, then no transmission may occur at that symbol, and the transmission may be pushed to the next slot. In such an embodiment, the value of M may then become one.

In certain embodiments, the rules guiding how at least one parameter is derived implicitly may be set by any entity located within the network. The rules may be configured semi-statically by means of higher layer signaling, for example, by determining the value of parameter k and by determining the possible values of first parameter M. While in the above example M either had a value of zero or one, in other embodiments the value of M may be any set of discrete numbers, such as one or two.

In yet another embodiments, first parameter M and second parameter N may be dynamically signaled using a single parameter. The single parameter may include a combination of first parameter M and second parameter N that were configured by higher layer signaling. For example, there may be four or eight different possible combinations configured by higher layer signaling. The number of different possible combinations may depend on how many signaling bits are available for the signaling. In the case of two bits, there may be four signaling states available, while three bits may have eight signaling states available. Each combination may indicate at least one predefined relative starting position and/or an absolute starting position. Both positions may be defined with regards to the DL or UL grant and/or the DL or UL data transmission. Although the above embodiments refer to first parameter M and second parameter N, the above embodiments may also apply to third parameter M2, fourth parameter N2, or any other parameter that may be used.

The above embodiments may be combined with any other configuration information. This may allow a network to avoid duplicative or similar information from being signaled. For example, information where the starting positions of mini-slots for data transmissions may be semi-statically configured by higher layer signaling may not need to be dynamically signaled to the UE. The combined parameters, that include any of the above discussed four parameters and any other configuration information, may yield a single combined parameter that points to one of the possible symbol positions. In certain embodiments, the UE may receive a combined parameter that may include a first parameter and a second parameter. For example, the single parameter may be a number, where zero represents a symbol position and one represents the next symbol position.

Figure 7:
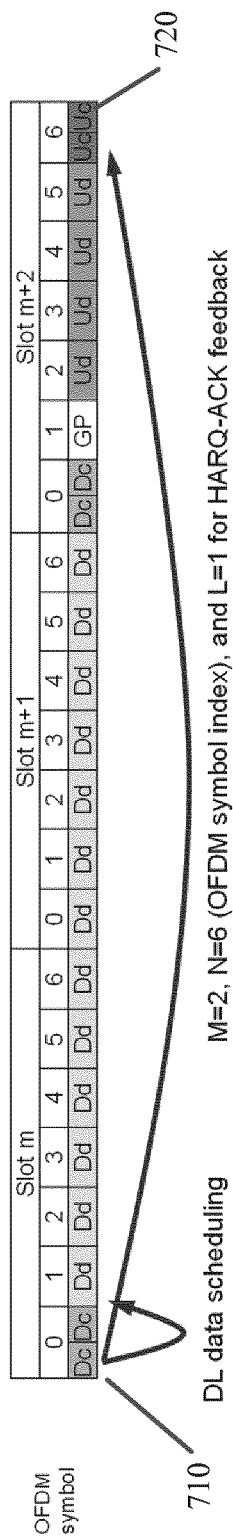
FIG. 7 illustrates a diagram according to certain embodiments.

As mini-slot starting positions may deviate from the position for conveying control signaling, a further delay parameter may be added to indicate a small offset that may range between zero OFDM symbols to one or more OFDM symbols. Zero symbols may correspond to no delay, while one symbol may correspond to a one symbol delay. In another embodiment, determining the transmission timing, such as scheduling timing and/or HARQ timing, may optionally include an additional parameter L that represents the OFDM symbol index corresponding to at least a second numerology. An embodiment of the additional parameter L is shown in FIG. 7. In certain embodiments, therefore, multiple numerologies may exist within a single symbol, slot, and/or mini-slot.

FIG. 3 illustrates a diagram according to certain embodiments. In particular, FIG. 3 illustrates a DL data scheduling timing for mini-slot based scheduling. As can be seen in FIG. 3, the same slot scheduling is used for a given mini-slot. As such, first parameter M may be semi-statically configured to zero. Second parameter N, on the other hand, may be dynamically indicated in the DCI, so that PDSCH may start in a different OFDM symbol. In the exemplary slot shown in FIG. 3 includes 7 OFDM symbols. Two symbols 310 are assigned for DL control information, three symbols 320 are assigned for DL transmission, and two more symbols 330 are also reserved for DL transmission. Symbols 320 and symbols 330 may be mini-slots having a duration of three symbols and two symbols, respectively.

From the perspective of the UE, the DL control may be received in OFDM symbol 1, and the data transmission corresponding to the received DL control information starts in OFDM symbol 5. In other words, the data transmission that corresponds to the DL control information received in symbols 310 does not start until symbols 330. The second parameter N in FIG. 3 may be the symbol offset with respect to DL control, so N may have a value equal to 4. Alternatively, parameter N may be defined as the absolute OFDM symbol index, in which case N has a value of 5.

In certain embodiments, third parameter M2 and fourth parameter N2 may also be considered when determining transmission time. Third parameter M2, in the embodiment shown in FIG. 3, may be semi-statically configured to zero, while fourth parameter N2 may have a value of 1 or 2, and may be implicitly obtained or indicated in DCI. Implicitly obtained, for example, may be that the value of the fourth parameter N2 is determined from the number of symbols allocated for conveying DL control information. N2 may indicate that the transmission ends after 1 or 2 symbols within the slot.

Figure 4:
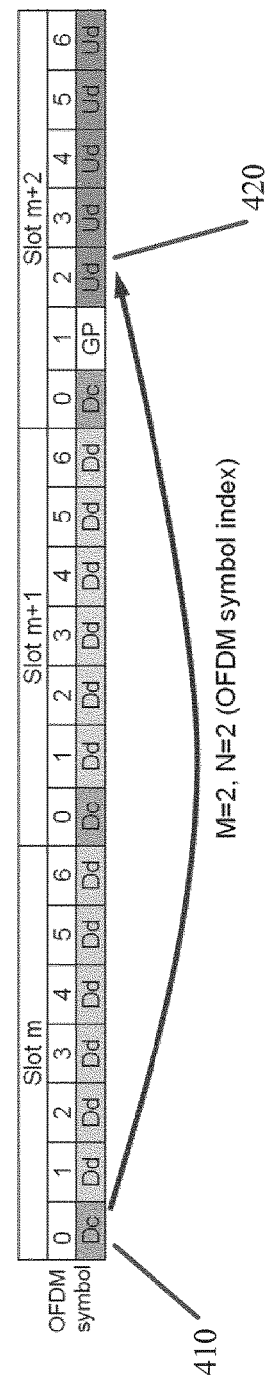
FIG. 4 illustrates a diagram according to certain embodiments.

FIG. 4 illustrates a diagram according to certain embodiments. In particular, FIG. 4 illustrates a UL data scheduling time for a slot-based scheduling in a TDD system. As shown in FIG. 4, first parameter M may be equal to 2. In other words, the transmission of which the UE is informed about in DL control information 410, is offset by two slots, as illustrated by the arrow in FIG. 4. Second parameter N shown in FIG. 4 may also be equal to 2. As can be seen in FIG. 4, although DL control information 410, which informs the UE of an UL data transmission, is located in symbol zero, the UL data transmission only begins in the second symbol of the third slot. As such, N may be equal to 2, where N is an OFDM symbol index.

Figure 5:
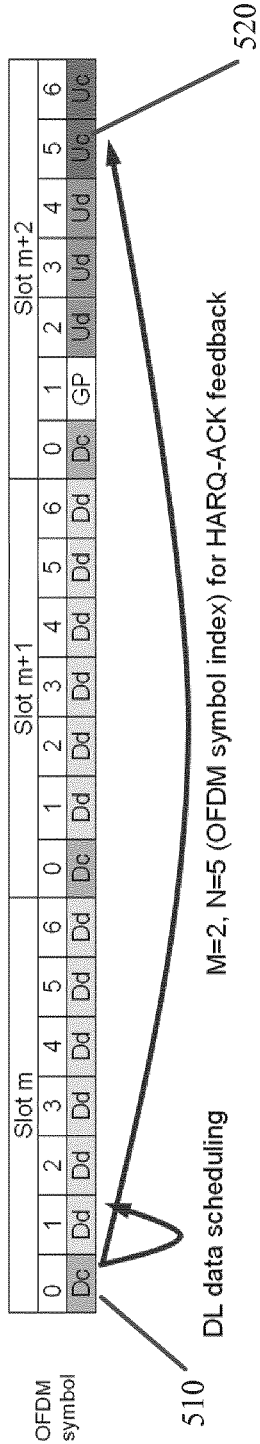
FIG. 5 illustrates a diagram according to certain embodiments

FIG. 5 illustrates a diagram according to certain embodiments. In particular, FIG. 5 illustrates HARQ-ACK timing for downlink data. As can be seen in FIG. 5, the value of first parameter M equals 2, while the value of second parameter N equals 5, where N is an OFDM symbol index. In other words, the HARQ-ACK may be received as part of symbol 520 two slots after DL control information 510 is received, and the UL control information in which the HARQ-ACK may be received is located in the fifth symbol of the third slot.

Figure 6:
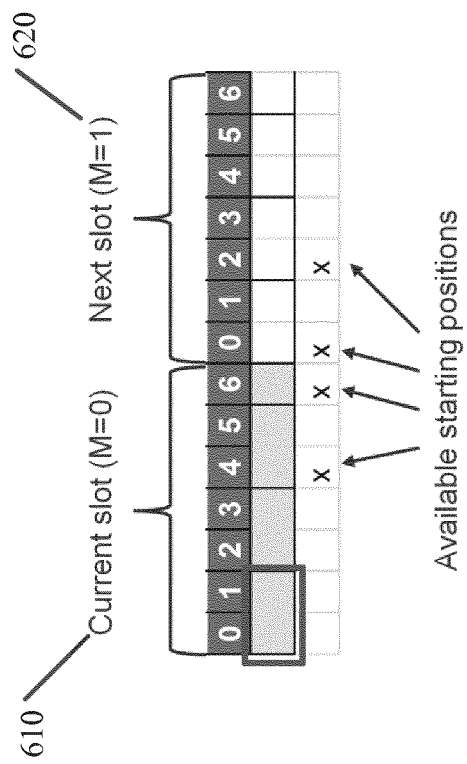
FIG. 6 illustrates a diagram according to certain embodiments.

FIG. 6 illustrates a diagram according to certain embodiments. In particular, FIG. 6 illustrates a combined signaling of first parameter M and second parameter N as a single parameter. As can be seen in FIG. 6, the absolute starting position x within the current slot 610 and the next slot 620 are represented by four signaling states configured by higher layer signaling. The four absolute starting position values may have a first parameter M value of zero, with a second parameter N value of either four or six, or a first parameter M value of one, with a second parameter N value of either zero or two. The starting position may be the position in which the uplink and/or downlink transmission initially occurs for the first time.

In certain embodiments, a two-bit signal may be used to indicate one of the four available states in FIG. 6. The two-bit signaling may occupy two symbols within the slot or mini-slot. The two-bit signaling, as shown in the highlighted box in FIG. 6, may allow for a flexible starting position within the current slots 610 and next slot 620, each of which include 7 OFDM symbols. In certain embodiments, only part of the predefined signaling values may be available for a given minimum processing time, as defined by the UE or the network specification, depending on where the DL or UL grant and/or where the DL or UL data transmissions occur.

FIG. 7 illustrates a diagram according to certain embodiments. In particular FIG. 7 illustrates HARQ-ACK timing for DL data with multiple numerologies. In certain embodiments, as shown in FIG. 7, data transmissions and control transmissions may use different numerologies. For example, data channels may use a SCS of 15 kHz, while downlink and/or uplink control channels may use a SCS of 30 kHz. The duration of the control OFDM symbol may therefore be half of that of the data OFDM symbol. In FIG. 7, DL control information 710 including a DL grant may be transmitted to the UE in control OFDM symbol 1 within the data OFDM symbol 0. The corresponding time location for HARQ-feedback 720 may be indicated according to a first parameter M having a value of 2, and a second parameter N having a value of 6, where N is an OFDM symbol index, and the value of an additional parameter L may equal 1. The value of additional parameter L may equal 1 because the control OFDM symbol 1, also known as the second control OFDM symbol within data OFDM symbol 6, receives the HARQ-ACK.

Figure 8:
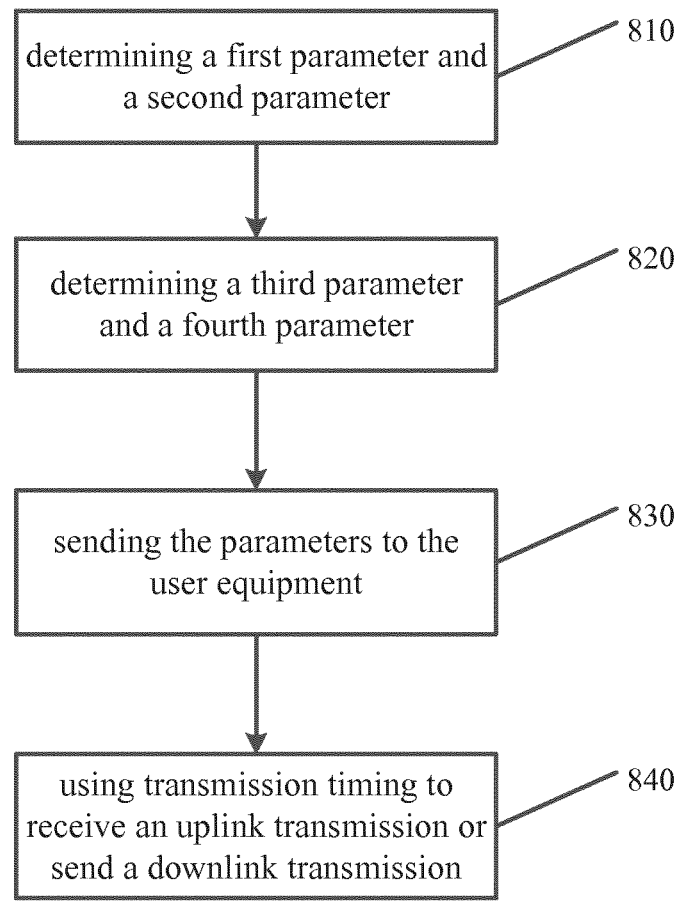
FIG. 8 illustrates a flow diagram according to certain embodiments.

FIG. 8 illustrates a flow diagram according to certain embodiments. FIG. 8 illustrates an embodiment of the network entity, such as a base station or a 5G NodeB (5G NB or gNB). In step 810, the network entity may determine a first parameter and a second parameter. The first parameter may indicate an offset as a number of slots. The second parameter may indicate an offset as a number of symbols within one of the slots. As shown in step 820, the network entity may also determine at the network entity a third parameter that may indicate an end of the transmission as a number of slots. The network entity may also determine a fourth parameter that may indicate the end of the transmission as a symbol position within one of the slots.

Once the parameters are determined, the network entity may send the first parameter and the second parameter from the network entity to a user equipment, as shown in step 830. In other embodiments, the network entity may send the third parameter and/or the fourth parameter to the UE as well. The sending of the parameters by the network entity may be dynamic. In step 840, the network entity may use using at least one of the first parameter, the second parameter, the third parameter, or the fourth parameter to determine a transmission timing for at least one of sending a downlink transmission from the network entity to the user equipment or receiving an uplink transmission at the network entity from the user equipment.

Figure 9:
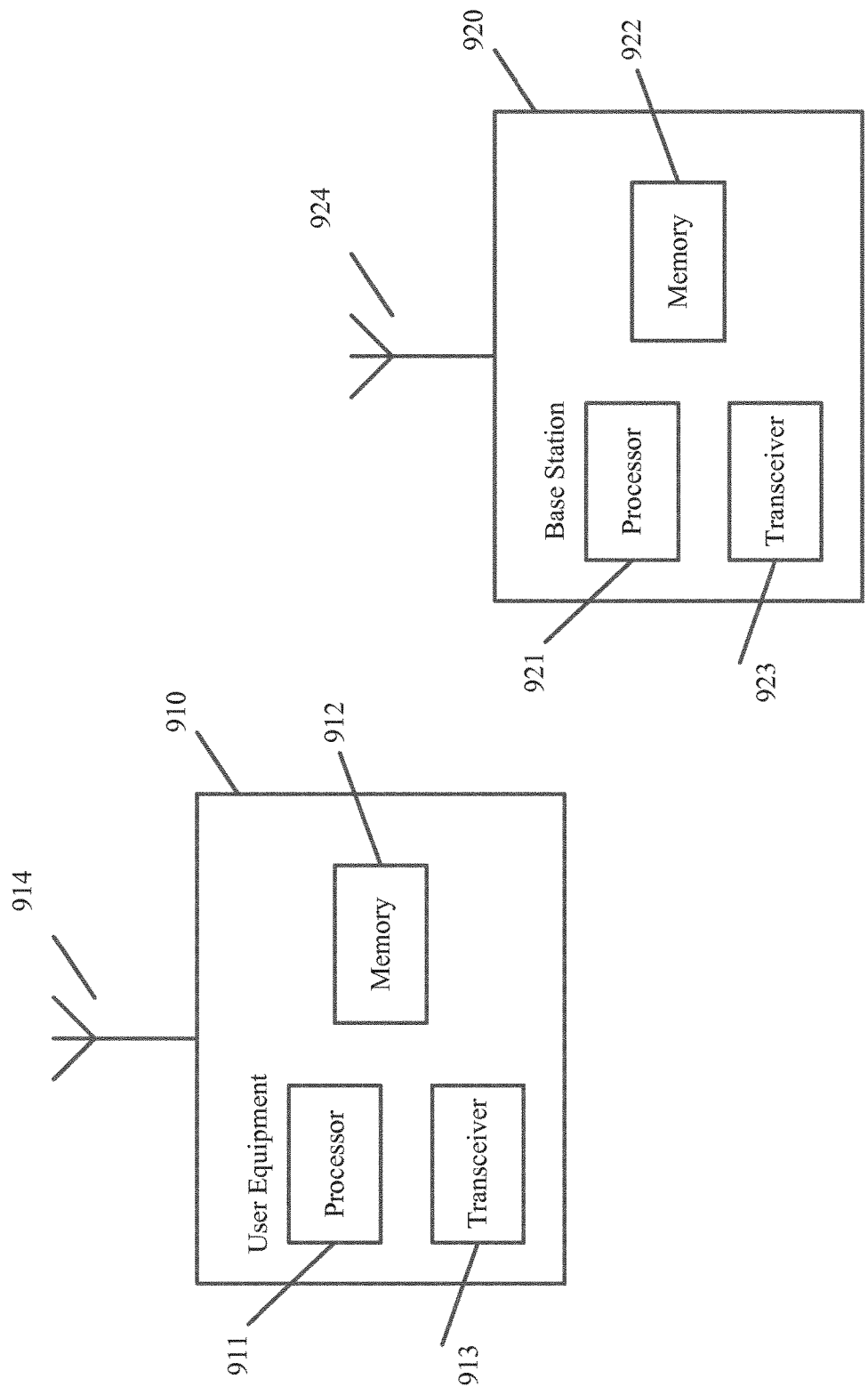
FIG. 9 illustrates a system according to certain embodiments.

FIG. 9 illustrates a system according to certain embodiments. It should be understood that each signal or block in FIGS. 1-9 may be implemented by various means or their combinations, such as hardware, software, firmware, one or more processors and/or circuitry. In one embodiment, a system may include several devices, such as, for example, network entity 920 or UE 910. The system may include more than one UE 910 and more one network entity 920. Network entity 920 may be a base station, such as a 5G NB, or an eNodeB (eNB), a network node, an access node, a server, a host, or any other network entity that may communicate with the UE.

Each of these devices may include at least one processor or control unit or module, respectively indicated as 911 and 921. At least one memory may be provided in each device, and indicated as 912 and 922, respectively. The memory may include computer program instructions or computer code contained therein. One or more transceiver 913 and 923 may be provided, and each device may also include an antenna, respectively illustrated as 914 and 924. Although only one antenna each is shown, many antennas and multiple antenna elements may be provided to each of the devices. Other configurations of these devices, for example, may be provided. For example, network entity 920 and UE 910 may be additionally configured for wired communication, in addition to wireless communication, and in such a case antennas 914 and 924 may illustrate any form of communication hardware, without being limited to merely an antenna.

Transceivers 913 and 923 may each, independently, be a transmitter, a receiver, or both a transmitter and a receiver, or a unit or device that may be configured both for transmission and reception. The transmitter and/or receiver (as far as radio parts are concerned) may also be implemented as a remote radio head which is not located in the device itself, but in a mast, for example. The operations and functionalities may be performed in different entities, such as nodes, hosts or servers, in a flexible manner. In other words, division of labor may vary case by case. One possible use is to make a network node deliver local content. One or more functionalities may also be implemented as virtual application(s) in software that can run on a server.

A user device or user equipment 910 may be a mobile station (MS) such as a mobile phone or smart phone or multimedia device, a computer, such as a tablet, provided with wireless communication capabilities, personal data or digital assistant (PDA) provided with wireless communication capabilities, portable media player, digital camera, pocket video camera, navigation unit provided with wireless communication capabilities or any combinations thereof. In other embodiments, the user equipment may be replaced with a machine communication device that does not require any human interaction, such as a sensor or a meter.

In some embodiments, an apparatus, such as a user equipment or a network entity, may include means for carrying out embodiments described above in relation to FIGS. 1-8. In certain embodiments, at least one memory including computer program code can be configured to, with the at least one processor, cause the apparatus at least to perform any of the processes described herein.

Processors 911 and 921 may be embodied by any computational or data processing device, such as a central processing unit (CPU), digital signal processor (DSP), application specific integrated circuit (ASIC), programmable logic devices (PLDs), field programmable gate arrays (FPGAs), digitally enhanced circuits, or comparable device or a combination thereof. The processors may be implemented as a single controller, or a plurality of controllers or processors.

For firmware or software, the implementation may include modules or unit of at least one chip set (for example, procedures, functions, and so on). Memories 912 and 922 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions may be stored in the memory and which may be processed by the processors can be any suitable form of computer program code, for example, a compiled or interpreted computer program written in any suitable programming language. The memory or data storage entity is typically internal but may also be external or a combination thereof, such as in the case when additional memory capacity is obtained from a service provider. The memory may be fixed or removable.

The memory and the computer program instructions may be configured, with the processor for the particular device, to cause a hardware apparatus such as network entity 920 or UE 910, to perform any of the processes described above (see, for example, FIGS. 1-8). Therefore, in certain embodiments, a non-transitory computer-readable medium may be encoded with computer instructions or one or more computer program (such as added or updated software routine, applet or macro) that, when executed in hardware, may perform a process such as one of the processes described herein. Computer programs may be coded by a programming language, which may be a high-level programming language, such as objective-C, C, C++, C#, Java, etc., or a low-level programming language, such as a machine language, or assembler. Alternatively, certain embodiments may be performed entirely in hardware.

Furthermore, although FIG. 9 illustrates a system including a network entity 920 and UE 910, certain embodiments may be applicable to other configurations, and configurations involving additional elements, as illustrated and discussed herein. For example, multiple user equipment devices and multiple base stations may be present, or other nodes providing similar functionality, such as nodes that combine the functionality of a user equipment and a base station, such as a relay node. The UE 910 may likewise be provided with a variety of configurations for communication other than communicating with network entity 920. For example, the UE 910 may be configured for device-to-device, machine-to-machine, or vehicle-to-vehicle communication.

The above embodiments provide for improvements to the functioning of a network and/or to the functioning of the network entities within the network, or the user equipment communicating with the network. Certain embodiments can provide a method, apparatus, means for, or a computer product for flexibility indicating the scheduling timing or the HARQ timing with an OFDM symbol granularity. Other embodiments may reduce overhead when at least one parameter may be semi-statically configured or implicitly determined, rather than being dynamically configured. The embodiments described above can allow for the effective use of dynamic TDD and/or mini-slots in a NR environment.

The features, structures, or characteristics of certain embodiments described throughout this specification may be combined in any suitable manner in one or more embodiments. For example, the usage of the phrases "certain embodiments," "some embodiments," "other embodiments," or other similar language, throughout this specification refers to the fact that a particular feature, structure, or characteristic described in connection with the embodiment may be included in at least one embodiment of the present invention. Thus, appearance of the phrases "in certain embodiments," "in some embodiments," "in other embodiments," or other similar language, throughout this specification does not necessarily refer to the same group of embodiments, and the described features, structures, or characteristics may be combined in any suitable manner in one or more embodiments.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. Although the above embodiments refer to NR and 5G technology, the above embodiments may apply to any 3GPP technology, including at least to LTE, LTE-advanced, 4th generation, or Internet of Things technology.

PARTIAL GLOSSARY

3GPP Third Generation Partnership Project
UE User Equipment
NR new radio
5G fifth generation
HARQ hybrid automatic repeat request
HARQ ACK HARQ acknowledgement
PDSCH physical downlink shared channel
PUCCH physical uplink control channel
OFDM orthogonal frequency division multiplexing
SCS subcarrier spacing
TDD time division duplex
FDD frequency division duplex
GP guard period
UL uplink
DL downlink
URLLC ultra-reliable and low-latency communications
eMBB enhanced mobile broadband
TTI transmission time intervals
TDM time division multiplexing
5G NB 5G NodeB
M first parameter
N second parameter
M2 third parameter
N2 fourth parameter
L parameter representing OFDM symbol index corresponding to a second numerology

We claim:

1. A method comprising:
    determining, at a user equipment, transmission timing based on a first parameter indicating an offset as a number of slots and a combined parameter comprising a second parameter and a fourth parameter, wherein the second parameter indicates an offset as a number of symbols within one of the slots and the fourth parameter indicates a duration of the transmission as the number of symbols within one of the slots; and
    using the transmission timing to at least one of send an uplink transmission from the user equipment to a network entity or receive a downlink transmission at the user equipment from the network entity.

2. The method according to claim 1, further comprising:
    determining the transmission timing based at least on a third parameter that indicates an end of the transmission as a number of slots.

3. The method according to claim 2, further comprising:
    receiving from the network entity at least one of the first parameter, the second parameter, the third parameter, or the fourth parameter.

4. The method according to claim 1, wherein the transmission timing is a scheduling timing or a hybrid automatic repeat request acknowledgment feedback timing.

5. The method according to claim 1, wherein the transmission may relate to a mini-slot operation.

6. The method according to claim 1, wherein the uplink transmission or the downlink transmission comprises a mobility reference symbol, a channel state information reference symbol, a physical uplink control channel transmission, a physical uplink shared channel transmission, a physical downlink control channel transmission, a physical downlink shared channel transmission, or a sounding reference symbol.

7. The method according to claim 2, wherein at least one of the first parameter, the second parameter, the third parameter, the fourth parameter, or an additional parameter are at least one of semi-statically configured, received at the user equipment from the network entity, or derived implicitly using at least one of the first parameter, the second parameter, the third parameter, or the fourth parameter.

8. The method according to claim 1, wherein multiple numerologies exist within at least a single symbol, slot, or mini-slot.

9. The method according to claim 1, wherein the offset in the second parameter includes an absolute symbol index within the slot.

10. The method according to claim 1, wherein the offset in the number of symbols in second parameter may include a number of symbols relative to a grant.

11. The method according to claim 2, further comprising:
    receiving at the user equipment a combined parameter that may include at least two of the first parameter, the second parameter, the third parameter, or the fourth parameter.

12. A method comprising:
    determining, at a network entity, a first parameter indicating an offset as a number of slots and a combined parameter comprising a second parameter and a fourth parameter, wherein the second parameter indicates an offset as a number of symbols within one of the slots and the fourth parameter indicates a duration of the transmission as the number of symbols within one of the slots;

sending the first parameter and the combined parameter comprising the second parameter and the fourth parameter from the network entity to a user equipment.

13. The method according to claim 12, further comprising:

determining at the network entity a third parameter that indicates the end of the transmission as a number of slots.

14. The method according to claim 13, further comprising:

using at least one of the first parameter, the second parameter, the third parameter, or the fourth parameter to determine a transmission timing for at least one of sending a downlink transmission from the network entity to the user equipment or receiving an uplink transmission at the network entity from the user equipment.

15. The method according to claim 13, wherein the number of slots includes an absolute symbol index within the slot.

16. The method according to claim 13, wherein the sending of at least one of the first parameter, the second parameter, the third parameter, or the fourth parameter by the network entity is dynamic.

17. An apparatus comprising:
at least one processor; and
at least one memory including computer program code, wherein the at least one memory and the computer program code are configured to, with the at least one processor, cause the apparatus at least to perform:

determining, at a user equipment, transmission timing based on a first parameter indicating an offset as a number of slots and a combined parameter comprising a second parameter and a fourth parameter, wherein the second parameter indicates an offset as a number of symbols within one of the slots and the fourth parameter indicates a duration of the transmission as the number of symbols within one of the slots; and using the transmission timing to at least one of send an uplink transmission from the user equipment to a network entity or receive a downlink transmission at the user equipment from the network entity.

18. A computer program product embodied on a non-transitory computer-readable medium, said medium encoding instructions that, when executed in hardware, perform the method according to claim 1.

19. An apparatus comprising:
at least one processor; and
at least one memory including computer program code, wherein the at least one memory and the computer program code are configured to, with the at least one processor, cause the apparatus at least to perform:

determining, at a network entity, a first parameter indicating an offset as a number of slots and a combined parameter comprising a second parameter and a fourth parameter, wherein the second parameter indicates an offset as a number of symbols within one of the slots and the fourth parameter indicates a duration of the transmission as the number of symbols within one of the slots;

sending the first parameter and the combined parameter comprising the second parameter and the fourth parameter from the network entity to a user equipment.

20. A computer program product embodied on a non-transitory computer-readable medium, said medium encoding instructions that, when executed in hardware, perform the method according to claim 12.

* * * * *